INVENTORS
SIDNEY M. RUBENS
ARNDT B. BERGH
PAUL E. OBERG
BY
Cushman, Darby & Cushman
ATTORNEYS INVENTORS
SIDNEY M. RUBENS
ARNDT B. BERGH
PAUL E. OBERG
BY Cushman, Darby & Cushman
ATTORNEYS 2,892,041

MAGNETIC TRANSDUCING APPARATUS

Sidney M. Rubens, Falcon Heights, Arndt B. Bergh, St. Paul, and Paul E. Oberg, Minneapolis, Minn., assignors to Sperry Rand Corporation, a corporation of Delaware Application October 11, 1954, Serial No. 461,404

16 Claims. (Cl. 179—100.2)

This invention pertains to devices for reading magnetically recorded information and particularly to a magnetic reading system whose output does not depend upon relative motion between the reading device and a magnetic recording medium.

In copending United States patent application Serial No. 253,189, filed October 25, 1951, by Sidney M. Rubens, there is described and claimed a magnetic reading device for detecting small magnetic fields such as those produced by the magnetized portions of magnetic media on which telegraphone signals or digital information have been recorded. The device may be employed with stationary or movable records, since detection is effected without regard to the velocity of the recording medium relative to the playback device.

Because its output is relatively independent of the playback speed from a tape speed of 30 inches per second down to and including zero inches per second, this device has been known as the magnetostatic reading head. While the conventional magnetic reading head responds to the time rate of change of flux established in the head by the magnetized recording medium so that its output depends on the playback speed, the magnetostatic reading head responds directly to the existence of flux on the recording medium. It is able to effect this operation in that its core or a large fraction thereof is energized by a high frequency, transverse magnetic field which periodically varies the reluctance of the core to pick up flux from the recording medium. Since no magnetic potential difference is established across the reading gap by this process, the magnetic record is not altered by its use. If the reluctance of the core is varied periodically at a frequency $f$ in a direction orthogonal to the signal flux in the core, a corresponding periodic variation in the signal flux occurs at a frequency of $2f$, thereby inducing a second harmonic E.M.F. in a signal output recording on the core. The amplitude of this second harmonic E.M.F. is proportional to the maximum amount of flux from the recording medium threading the core, provided the effective incremental permeability of the unsaturated portion of the core remains constant.

The present invention is an improvement in principle and in construction over the magnetic reading device disclosed in the above mentioned patent application and also relates to means for improving the performance of such device. More specifically, the present invention relates to a magnetostatic reading head providing an essentially flat response to recordings made dynamically over a wide range of audio and sub-audio frequencies while holding the output amplitude to within 5% of linearity and producing a signal-to-noise ratio equivalent to more than 30 to 1. The core of the improved magnetostatic reading head comprises two polepieces joined by a yoke in such a manner that they define a narrow, non-magnetic reading gap. The core, as in the magnetic reading device of the above mentioned patent application, is either cut and bent from a sheet or sheets of a highly permeable ferromagnetic material such as "Mumetal" or "Permalloy" or may be molded from a ferromagnetic ferrite. The yoke is constructed in two sections so that the energizing current passes through one section in one direction while passing through the other section in the opposite direction. With this arrangement the yoke is periodically magnetized, but the mutual coupling between the conducting yoke and the output winding is low and at the same time, no field is created across the gap. This new core gives rise to a number of improved features to be included in the magnetostatic reading head as will be appreciated from reading the description below with reference to the attached drawings. Improvements have also been effected in the associated circuitry, particularly toward freeing the output from amplitude distortion.

It is, therefore, an object of this invention to provide an improved magnetic reading device for detecting the direction and degree of magnetization of a ferromagnetic recording medium without relative motion between the recording medium and the reading device.

It is a further object of this invention to provide a magnetostatic reading head which produces an essentially flat response in reading magnetic recordings over a wide range of audio and sub-audio frequencies with a good signal-to-noise ratio and low distortion.

It is another object of this invention to provide a magnetostatic reading head wherein the energizing flux creates no field and no drop in potential across the reading gap so that the gap may be soldered to hold gap spacing to a minimum and incidentally result in a stronger structure.

It is a further object of this invention to provide a magnetostatic reading head which is characterized by its economical, sturdy construction as well as by its improved performance.

Further objects and advantages of this invention will be in part expressed and in part obvious from the following description and claims and in the accompanying drawings, in which:

Figures 1, 3:
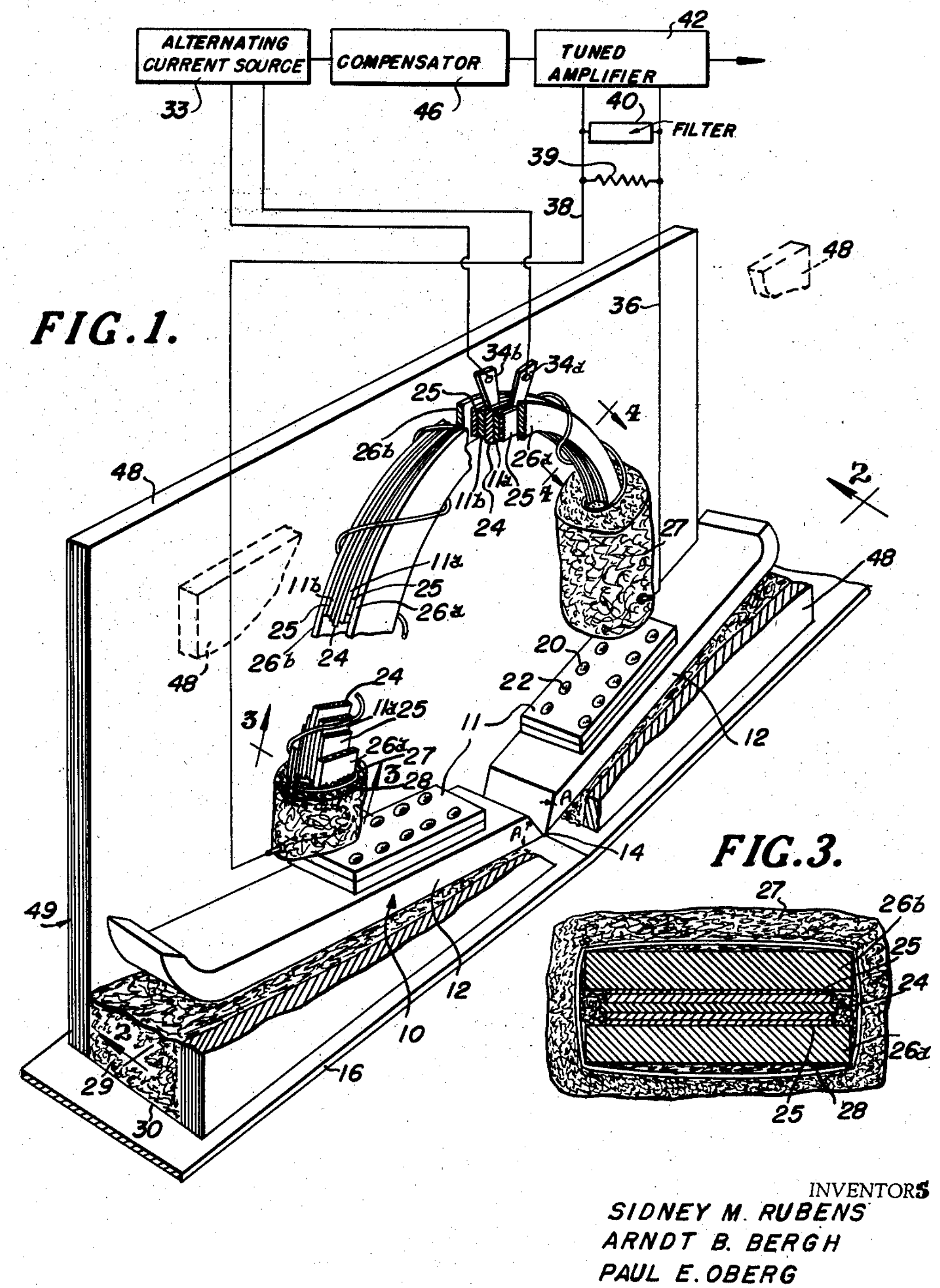
Figure 1 is a combined block diagram and structural drawing which displays a first embodiment of a magnetostatic reading system and its associated circuitry.
Figure 3 is a cross-sectional view along the line 3—3 of Figure 1 showing the structure of the yoke.

Referring to Figure 1 of the drawing, there is shown a magnetostatic reading head, the core 10 of which is comprised of a semi-circular yoke 11 connecting a pair of pick-up means or polepieces 12 in a manner such that they may define between them a narrow, non-magnetic gap 14. The yoke 11 and polepieces 12 may be cut and bent from thin sheets of any ferromagnetic material of suitably high permeability, or they may be molded from a ferromagnetic ferrite. The head illustrated in Figure 1 is constructed to reproduce signals recorded on magnetic tape 16 and particularly to produce a flat response regardless of playback speed or a response which is substantially constant and wholly independent of playback speed.

Figure 2:
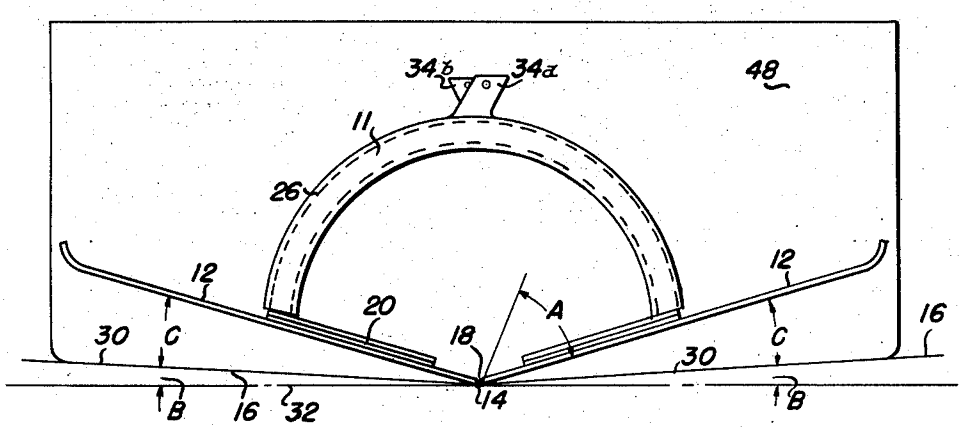
Figure 2 is an elevational view of the device of Figure 1 on line 2—2.

In constructing the magnetostatic reading head shown in Figures 1, 2, 3 and 4 using sheets of ferromagnetic material, the polepieces 12 may be cut on a bias and the gap end 18 of each filed and polished to form an angle A in the order of 50 degrees with the face that will touch the magnetic tape 16 (see Fig. 2). Two horseshoe-shaped members such as layers 11*a*, 11*b* of the yoke may be cut from a very thin sheet of, preferably, the same ferromagnetic material into U-shaped portions and bent at their ends to form a pair of "feet" or flanges 20 which fit flush against the polepieces 12 when the latter are in position and attached to the flanges 20 as by spot welds 22. A thin insulator 24 made of material, such as transformer parchment, may be placed between the circular portions of the two layers of yoke 11*a* and 11*b* and may protrude from between the yoke layers if desired. Strips 26*a* and 26*b* of rigid insulating material may be disposed along the outside of the yoke layers 11*a* and 11*b*, respectively, to provide strength and fully protect the yoke layers, and may, for convenience, be adhered thereto by a very thin coating 25 of a suitable adhesive. A winding 28 in the order of 1,000 turns of small gauge (preferably #40 or #42) insulated copper wire is wound on the circular portion of the yoke 11 and distributed thereon as evenly as possible. This may be accomplished with comparative ease by the aid of a very thin layer of adhesive (not shown) with the winding 28 being applied thereto while the adhesive is somewhat tacky. While the number of turns in winding 28 could vary considerably from 1,000 turns without deleterious results, that number may be conveniently applied to this particular yoke. The assembly thus far described may be coated with a comparatively thick layer of insulative material 27 (Fig. 3) to protect it from pressure resulting from the potting process since the whole core assembly is embedded in a suitable potting compound 29, such as one of the epoxy resins, to provide structural stability and means for mounting the assembly and to provide a surface 30 along which the magnetic tape 16 may be drawn to achieve the desired tape-to-polepiece spacing over the entire length of the head. The surface 30 recedes on each side of the gap 14 from the horizontal line 32 at an angle of about 3 degrees (angles B of Figure 2) in order to assure that the tape 16 firmly contacts the polepieces 12 in the region of the gap 14. However, the tape 16 may be positioned in other predetermined configurations if means such as a resilient pad is employed to maintain the tape in position. The outer ends of polepieces 12 may be turned up as shown in Figure 1, if desired, for providing a hook or anchor for the potting compound, thus giving the potted head greater structural strength.

Figures 4, 5:
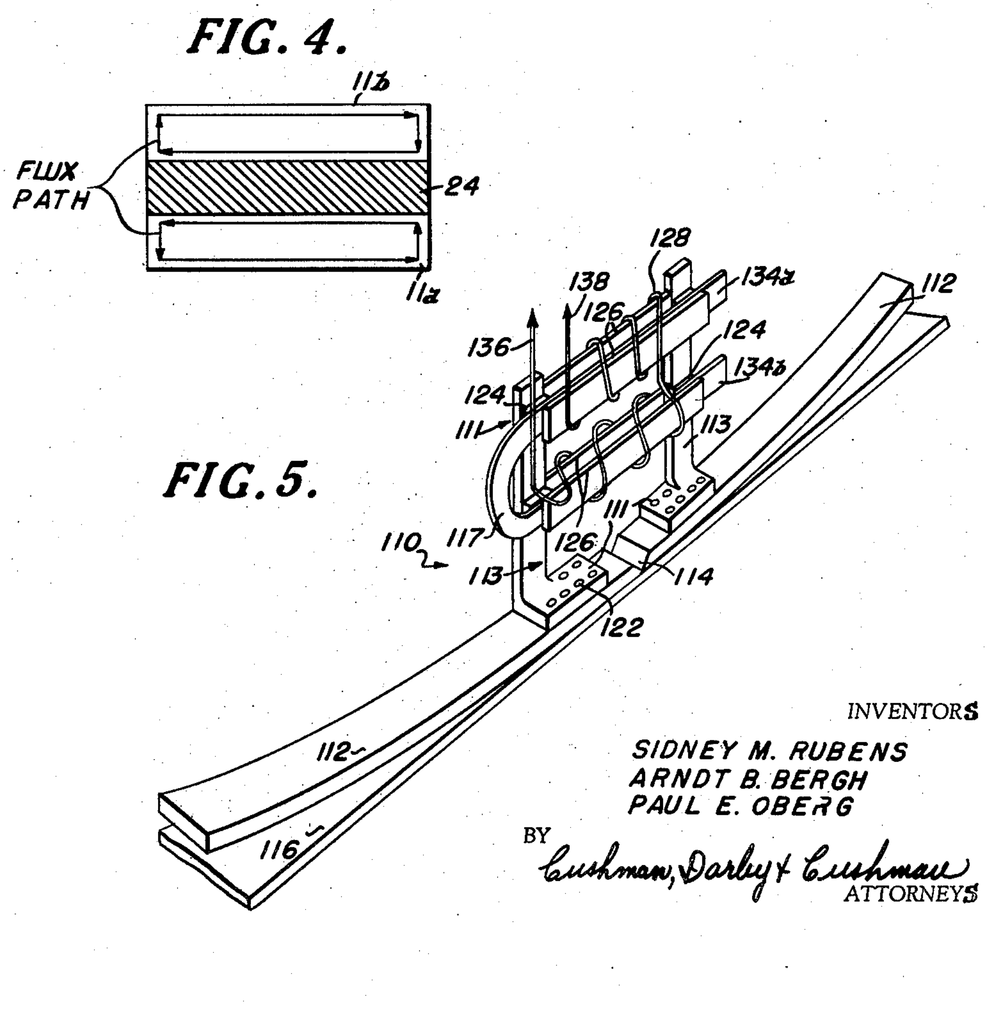
Figure 4 is a cross-sectional view along the line 4—4 of Figure 1 showing the direction of flux in the yoke.
Figure 5 is a perspective view of a further embodiment of the invention whereby the range of flat response is extended further into the long wavelengths.

By connecting an alternating current source 33 to tabs 34*a* and 34*b* of yoke layers 11*a* and 11*b*, respectively, a circuit is produced in which current at any instant flows from one of tabs 34 down each leg of that yoke layer to the polepieces 12 and anti-parallel to itself to the tab at the top of the other yoke layer. With this construction, substantially non-inductive current loops are formed, and minimum coupling between the circuit of the energizing current from source 33 and the pick-up winding 28 results. The magnetizing flux created by this energizing current lies in planes of cross-sections of the yoke 11, as shown in Figure 4, so that no field is set up across reading gap 14 and the record on the magnetic tape is accordingly undisturbed. Since the voltage applied by the A.-C. source 33 has substantially the same value on both polepieces 12, the gap 14 may be soldered for physical strength without permitting a flow of current across the gap. By the same token, the gap spacing may be kept to a minimum, e.g., 0.0001 inch, resulting in better performance at short wavelengths. If desired, a thin copper or silver shim may be soldered in place between the gap ends 18 of the polepieces.

A number of well known circuits are suitable for use as the alternating current source 33. A crystal oscillator is preferred in that it can produce an output which is stable both as to frequency and amplitude and particularly insensitive to temperature change. Since the reluctance of the core 10 is in a large measure dependent upon the intensity of transverse magnetization, the crystal oscillator must produce an amplified output which is at least sufficient to magnetize the core periodically to saturation in opposite directions.

The magnitude of the tape signal flux passing through the core 10 is in turn a function of the reluctance of the flux path through the core. Accordingly, if the total reluctance of core 10 is varied in a controlled manner, the tape signal flux threading the core is varied. Since the yoke 11 of the magnetostatic reading head forms the core of the output winding 28, the E.M.F.'s induced in the output winding are derived from any time rate of change of flux which passes longitudinally around the yoke from one polepiece 12 to the other. Because the effective permeability of the core is inversely proportional to its reluctance, it will be appreciated that the permeability will go through a maximum and a minimum twice for every complete hysteresis cycle of the core. If the yoke is energized by a current having a frequency of 75 kc./second, the hysteresis loop will be traversed at this frequency, and therefore the effective longitudinal permeability will vary at the frequency 150 kc. As a result of this oscillation in permeability, an E.M.F. of the frequency 150 kc. is induced in the output winding 28. This output E.M.F., comprised of the background E.M.F. (at least first and second harmonics of source 33) and the signal E.M.F., is in the form of a modulated carrier which must be de-modulated in order to reproduce the information recorded on the magnetic tape 16. The output leads 36 and 38 of winding 28 go to voltage responsive means being first shunted by load resistor 39 which may have an impedance in the order of that of winding 28. However, the value of resistor 39 is not critical and the resistor may, in fact, be eliminated from the circuit without substantially affecting its performance. Output leads 36 and 38, shunted by filter 40 to reject the frequency of current source 33, are also connected to voltage responsive means as amplifier 42 which is tuned to the second harmonic of the frequency of source 33. The output from tuned amplifier 42 on line 44 may be rectified or it may be examined directly.

To correct for elements in the output signal resulting from all effects other than the detected tape magnetization, the circuit is provided with a compensator 46 which is comprised of a frequency doubler and a phase-shifting network each of which is well known to the art. The output voltage of the compensator 46 is regulated to be of such magnitude, frequency, and phase with respect to the background voltage induced in winding 28 at the second harmonic frequency by the source 33 that the background voltage is modified to obtain a suitable second harmonic output level. The compensator 46 may be connected to the tuned amplifier 42, preferably at the cathode of the first gain stage to avoid loading the head.

It should be noted that the layers of yoke 11*a* and 11*b* are preferably cut from a very thin sheet of ferromagnetic material, e.g., 0.001 inch "Mumetal" or "Permalloy." This allows the core 10 to be energized at a relatively high frequency such as 75 kc./second and yet be substantially free from eddy current losses and resultant undesirable heating effects. Higher energization frequencies would increase the sensitivity and can be used without an appreciable increase in eddy current losses if the yoke layers 11*a* and 11*b* are made from thinner material. The polepieces 12 may, however, be cut from relatively thick sheets of ferromagnetic material regardless of the frequency used. A thickness of 0.014 inch has proved to be satisfactory, both in performance and in structural stability.

The magnetic reading head illustrated in Figure 1 detects magnetization on the tape 16 at playback speeds ranging from zero to 30 inches per second with the output being completely independent of the playback speed even though the information was recorded at 15 or 30 inches per second. It will produce as flat a response as possible in the range of 20 to 12,000 cycles per second, corresponding to wavelengths of 1.5 to 0.0025 inch, for recordings made at 30 inches per second. The limit of flat response in the longer wavelengths has been found to be in the order of the overall length of that portion of the core 10 adjacent to the tape. Therefore, the polepiece spread (total length of both polepieces 12) of the reading head of Figure 1 is made about 1.5 inches for flat response to the 1.5 inch wavelengths. It has been discovered that the polepieces 12 of a head of this size must be substantially straight to produce a flat response, and that for an unshielded head, the angle C between each polepiece 12 and the magnetic tape 16 must be approximately 25 degrees. This sharp angle would cause excessive head wear, eventually enlarging the gap to destroy the response in the short wavelengths. This difficulty is corrected by the use of side-shields 48 cut from a thin ferromagnetic sheet an annealed in the same manner as the core 10 of the reading head. The shields 48 in a preferred embodiment consist of alternate layers 49 of a highly conductive material such as copper and previously annealed sheets of permeable material. The side-shields 48 may be cut to fit flush with surface 30 of the potting compound as shown in Figures 1 and 2 and so contact the magnetic tape 16. Hence, some of the flux passing from the tape to the reading head is diverted from the head winding 28 to side-shields 48 so that the tape-to-polepiece angle C must be considerably reduced to result in the same amount of flux passing through the winding 28 as would pass through an unshielded head with polepieces in the 25-degree configuration. The percentage of flux diverted to shields 48 is dependent both upon the width and length of polepieces 12.

It has been discovered that to achieve a maximum signal-to-noise ratio, the width of the polepieces preferably approximate the width of the track on magnetic tape 16 from which signals are being reproduced by the magnetostatic reading head. Since the polepiece spread is governed by the required limit of flat response in the longer wavelengths as was pointed out above, the tape-to-polepiece angle C will have some minimum value according to the performance requirements stipulated for the head. For a head having a polepiece spread of 1½ inches operating over a track 0.18 inch wide and so having a 0.18 inch polepiece width, it has been found that the tape-to-polepiece angle C must be 13 degrees to give a flat response, an angle which has proved to be satisfactorily small. This angle could, of course, be increased by altering either the size or the location of shields 48.

Two or more magnetostatic reading heads may be mounted adjacent each other for multi-track operation with each head separated from an adjacent head by a single shield 48, which shield is preferably formed of alternate layers of a highly conductive metal and previously annealed permeable material. Since the magnetic tape 16 moves in contact with the shields 48, each head will be effectively shielded from the other heads and from the signals recorded on their associated tracks.

As shown in the above mentioned Rubens application the whole magnetostatic reading head as shown in Figure 1 or Figure 5 is enclosed in a box shield (not shown) for protection from stray magnetic fields and from the earth's influence. This box may be constructed from sheets of highly permeable material to enclose the core 10 and portions of the tape 16 adjacent to it. Small windows are cut through the ends of the box to permit entrance and exit of the tape 16.

Reference is now made to Figure 5 in which there is shown an alternative embodiment for the magnetostatic reading head. The polepieces 112 are designed for the reproduction of wavelengths as long as six inches and so have an overall spread of six inches since, as was pointed out above, the limit of flat response in the longer wavelengths is in the order of the total lengths of the polepieces. Although the yoke 111 of Figure 5 differs in construction from yoke 11 of Figures 1–4, it is interchangeable therewith since the range and flatness of response of the magnetostatic reading head is largely dependent upon the size and geometry of the polepieces. It has been found that the polepieces 112 of a six-inch long magnetostatic head must be slightly curved as shown in Figure 5 to produce a flat response whereas the polepieces 12 as shown in Figure 2 were of necessity substantially straight. The polepieces 112 are straight or very slightly curved for at least an inch or more on either side of the gap 114, but then recede from the tape 116 in a gentle curve.

The particular magnetostatic reading head illustrated in Figure 5 will read signals recorded on one of two tracks on a magnetic tape 116 only one-quarter inch wide. Hence, the polepieces 112 are about 0.09 inch wide (the width of the magnetization on the tracks) or approximately half the width of the polepieces 12 of Figures 1–4. The narrower width and greater spread of the polepieces 112 result in a reduction of the tape-to-polepiece angle to about 3 degrees in the region of the gap 114.

The yoke 111 is comprised of a pair of risers 113 and a U-shaped crosspiece 117. The risers 113 are fastened to pick-up means or polepieces 112 by spot welds 122 in a manner similar to the construction of the core 10 of Figures 1–4. The U-shaped crosspiece 117 is supported by risers 113, but separated therefrom by thin insulators 124 which may be cut from material such as transformer parchment. The risers 113 are preferably spaced about one-half inch from each other, it having been discovered that a wider spacing reduces signal-to-noise ratio, apparently because of the relatively large amount of signal flux being diverted to the side-shields (not shown in Figure 5). Supporting strips 126 are fastened along the arms of crosspiece 117 for support and may overlay the crosspiece arms for protection thereof. After the yoke is coated with a spongy insulating material (not shown) an output winding 128 is applied to the crosspiece 117 in two equal portions, one coiled about each arm, connected in series aiding. Winding 128 is limited to 250 turns, 125 about each arm of crosspiece 117, because of the close spacing of the risers 113 and the limitation of the width of the head to about 0.09 inch. The winding 128 could instead be laid around both arms of crosspiece 117 simultaneously, but the manner of application shown in Figure 5 is preferred. Output leads 136, 138 correspond to leads 36, 38 of Figure 1.

The cross piece 117 is magnetized by a high frequency alternating current applied to tabs 134*a* and 134*b* to vary periodically the reluctance of the path of the signal flux. Since the thickness of insulating layers 124 is very small and the area relatively large, the reluctance presented thereby is small compared to the reluctance of the total path of the signal flux through polepieces 112, risers 113 and both arms of the cross piece 117. Hence, insulating layers 124 do not materially decrease the amount of signal flux threading the core 110.

It should be noted that the cross piece 117 is preferably very thin, for example 0.001 inch, to keep eddy currents to a minimum and so is reinforced by supporting strips 126. Polepieces 112 and risers 113 may be of much heavier construction and in using Mumetal therefor, 0.014 inch has proved very satisfactory.

In the above description second harmonics and frequency doubling techniques have been described. However, as was noted in the above cited Rubens application, any even harmonic can be used to determine both magnitude and direction of magnetization of the record.

Since many changes could be made in the above construction and embodiments of this invention could be made without departing from the scope thereof, it is intended that all matter contained in the above description be interpreted as illustrative and not limitative, the scope of the invention being defined in the appended claims.

What is claimed is:

1. In apparatus for detecting remanent magnetization along a record member positioned in a predetermined configuration irrespective of relative motion between the record member and the apparatus, said record member having signals recorded thereon in the form of remanent magnetization with the recorded wavelength of said signals being in a predetermined range of such wavelengths including recorded wavelengths at least as long as one inch, and wherein the reluctance of the means forming a magnetic flux path is varied by a fluctuating source of current: pick-up means attached to the path-forming means for producing a substantially flat response over said predetermined range of wavelengths, said pick-up means including means defining a gap at least as narrow as the length of the shortest wavelength in said predetermined range, said pick-up means extending from either side of the gap along the direction of the record member a distance substantially commensurate with one half the length of the longest wavelength in said predetermined range.

2. Apparatus as in claim 1 wherein the pick-up means is straight along its length from at least near each end thereof to said gap.

3. Apparatus as in claim 1 wherein the pick-up means is positioned from the record member on either side of the gap at an angle which is predetermined for a flat desired response characteristic during the detecting of said wavelengths.

4. Apparatus as in claim 1 wherein the pick-up means is curved substantially throughout its length.

5. Apparatus as in claim 1 wherein the pick-up means is substantially straight for a short distance adjacent said gap and curved thereafter to its outer ends.

6. Apparatus as in claim 1 wherein said pick-up means is substantially the same width as said magnetized portion of the record member.

7. In apparatus for detecting remanent magnetization in a track along a record member irrespective of relative motion between the record and the apparatus, said record member having signals recorded thereon in the form of remanent magnetization with the recorded wavelength of said signals being in a predetermined range of such wavelengths including recorded wavelengths at least as long as one inch, and wherein the reluctance of the means forming a magnetic flux path is varied by a fluctuating source of current, pick-up means substantially as wide as the magnetic portion of the record member attached to the path forming means for producing a substantially flat response and a predetermined signal to noise ratio over said predetermined range of wavelengths, said pick-up means including means defining a non-magnetic gap at least as narrow as the length of the shortest wavelength in said predetermined range, said pick-up means being straight and extending along the record member at an angle thereto and for a distance from either side of the gap substantially commensurate with one-half the length of the longest wavelength in said predetermined range, thereby providing a predetermined flat response.

8. In apparatus for detecting remanent magnetization in a track along a record member irrespective of relative motion between the record and the apparatus, said record member having signals recorded thereon in the form of remanent magnetization with the recorded wavelength of said signals being in a predetermined range of such wavelengths including recorded wavelengths at least as long as one inch, and wherein the reluctance of the means forming the magnetic flux path is varied by a fluctuating source of current, pick-up means substantially as wide as the magnetized track and attached to the path-forming means for producing a substantially flat response and a predetermined signal to noise ratio over said predetermined range of wavelengths, said pick-up means including means defining a non-magnetic gap at least as narrow as the length of the shortest wavelength in said predetermined range, said pick-up means being substantially straight for a short distance adjacent the gap and slightly curved thereafter to its outer ends and extending along the record member at an angle thereto and for a distance from either side of the gap substantially commensurate with one-half the length of the longest wavelength in said predetermined range, thereby providing a predetermined flat response.

9. Apparatus as in claim 1 and further including a shield positioned adjacent at least one side of the pick-up means and extending substantially the length thereof, one edge of the shield being arranged to be substantially in contact with the record member, the shield comprising alternate layers of highly conductive metal and magnetically permeable material.

10. Apparatus for detecting remanent magnetization along a record member positioned in a predetermined configuration adjacent the apparatus irrespective of relative motion between the apparatus and the record comprising a core having a yoke and two polepieces, the polepieces being connected to the yoke in such manner that their inward ends define a narrow non-magnetic gap, said yoke comprising two horseshoe-shaped members having a U-shaped portion and a flange depending from each end of the U-shaped portion, the respective flanges of each U-shaped portion being connected together and to said polepieces in such manner that the U-shaped portions are closely spaced apart, a source of alternating current connected directly to the yoke, the arrangement being such that current flows in opposite directions in the adjacent U-shaped portions, the current producing fluctuating amounts of flux in the yoke, thereby periodically varying the reluctance of said core, and a winding inductively coupled about the yoke and wound to lie substantially in the direction of the path of said fluctuating flux, said polepieces and yoke also forming a path for the flux of said remanent magnetization in a direction perpendicular to the fluctuating flux path and therefore at right angles to the winding, said winding thereby being energized by a varying voltage generated substantially solely by the flux in the record member following its path through the core and varying therewithin in accordance with the reluctance variations of the core.

11. Apparatus for detecting remanent magnetization along a record member irrespective of relative motion between the apparatus and the record member comprising a core having a yoke and two polepieces, the polepieces being connected to the yoke in such manner that their inward ends form a narrow non-magnetic gap, said yoke comprising one member for each polepiece attached thereto and extending generally perpendicular in the same direction from each polepiece and a complete current path means insulatingly attached to said members, a source of alternating current connected to said current path means for establishing therein a fluctuating flux, thereby periodically varying the reluctance of the core, a winding inductively coupled about said current path means and wound to lie substantially in the direction of the path of said fluctuating flux, said polepieces and yoke also forming a path for the flux of said remanent magnetization in a direction perpendicular to the fluctuation flux path and therefore substantially at right angles to the winding, said winding thereby being energized by a varying voltage generated substantially solely by the flux in the record member following in path through the core and varying therewithin in accordance with the reluctance variations of the core.

12. Apparatus as in claim 11 wherein said complete current path means comprises a U-shaped crosspiece and said winding is disposed about each arm of the crosspiece in a series aiding relation.

13. In apparatus for detecting remanent magnetization along a record member irrespective of relative motion between the apparatus and the record member, means forming a magnetically permeable flux path, a non-magnetic pick-up gap in said path to be positioned in proximity to the record member, means for applying an alternating voltage across a portion of the means forming said flux path whereby a resulting alternating current through said portion creates a flux within said portion for controlling the reluctance of said portion, reading output means inductively coupled with the means forming the magnetic flux path for providing an output current, the means for forming the flux path and the means for applying said alternating voltage across a portion thereof being arranged to preclude the establishment of an electric potential across said non-magnetic pick-up gap, wherefore no electric current flows across said non-magnetic pick-up gap even if same be electrically conductive.

14. Apparatus as in claim 13 wherein the portion of the magnetic flux path which carries said alternating current is in the form of at least one loop, and the reading output means comprises a winding wound about at least a part of said loop.

15. Apparatus as in claim 13 wherein the current carrying portion of said flux path is comprised of two magnetically permeable yoke members each bridging said non-magnetic pick-up gap and insulated from one another throughout their length but electrically connected at the ends thereof, and wherein the means for passing alternating current through said portion includes connection points on the respective yoke members at the centers thereof, the arrangement being such that symmetrical current carrying loops of magnetic material are formed to either side of said connection points.

16. Apparatus as in claim 13 wherein the means forming the magnetic flux path comprises magnetically permeable members defining said non-magnetic pick-up gap, and comprises two spaced magnetically permeable bridging members each joining said gap defining members but electrically insulated therefrom by insulating members, means electrically connecting one end of each of the spaced bridging members together, and wherein the means for passing alternating current through said portion of said flux path includes connection means for connecting said current to the opposite ends of said bridging members.

References Cited in the file of this patent

UNITED STATES PATENTS

| | | |
|---|---|---|
| 2,531,642 | Potter | Nov. 28, 1950 |
| 2,536,260 | Burns | Jan. 2, 1951 |
| 2,608,621 | Peterson | Aug. 26, 1952 |
| 2,649,568 | Welch | Aug. 18, 1953 |
| 2,700,703 | Nordyke | Jan. 25, 1955 |
| 2,768,243 | Hare | Oct. 23, 1956 |
| 2,769,036 | Selsted | Oct. 30, 1956 |